Patented Oct. 27, 1936

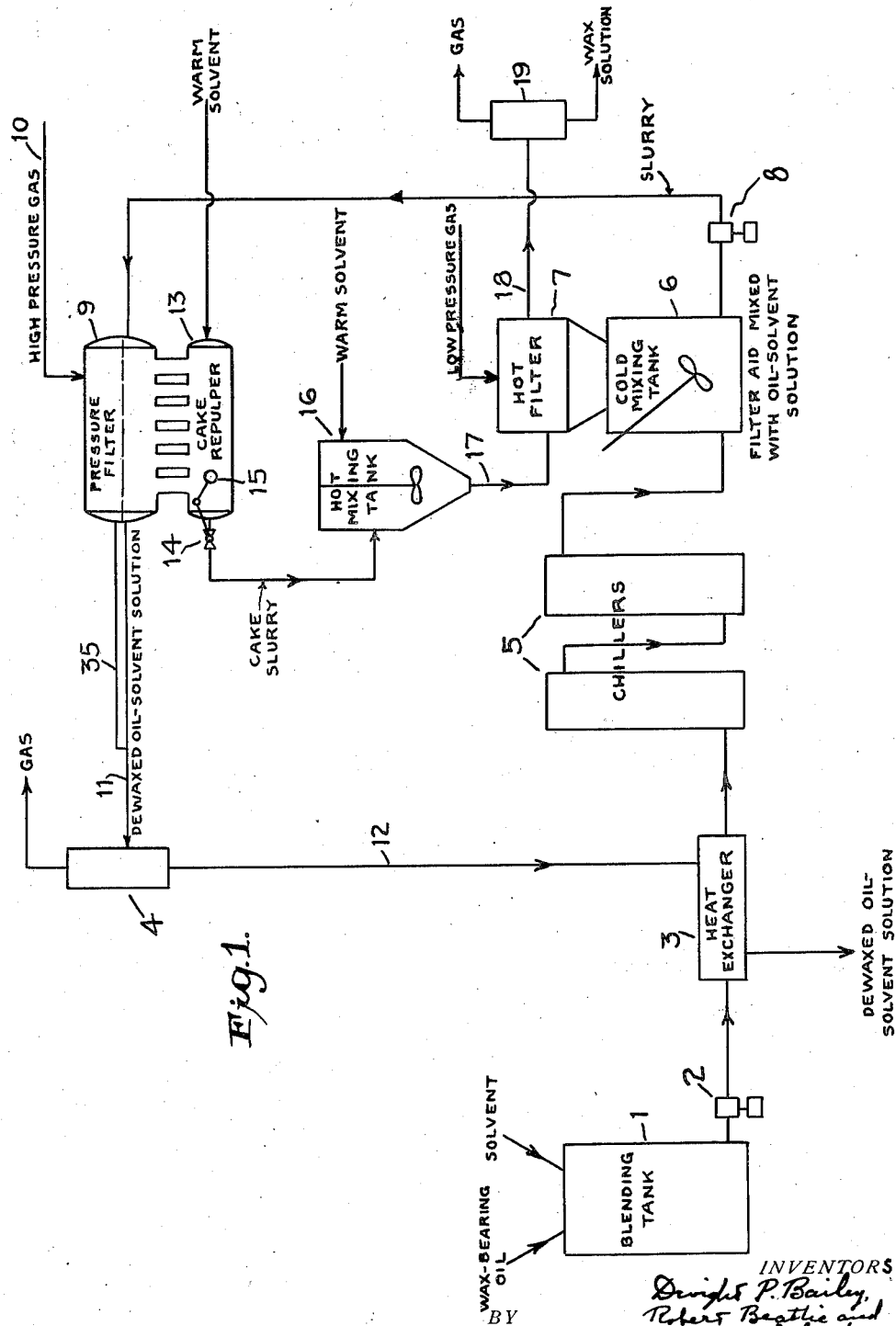

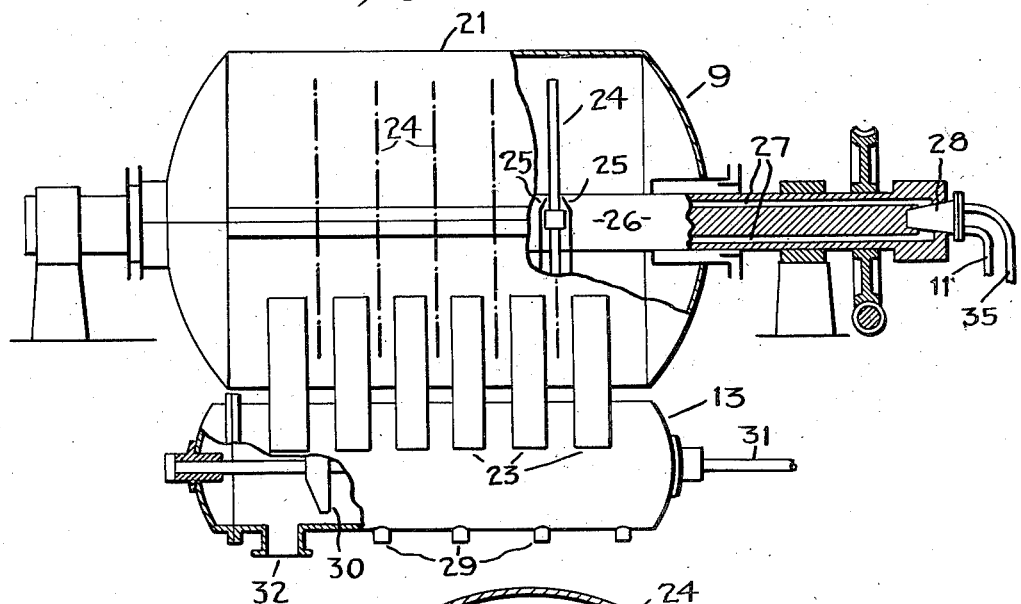
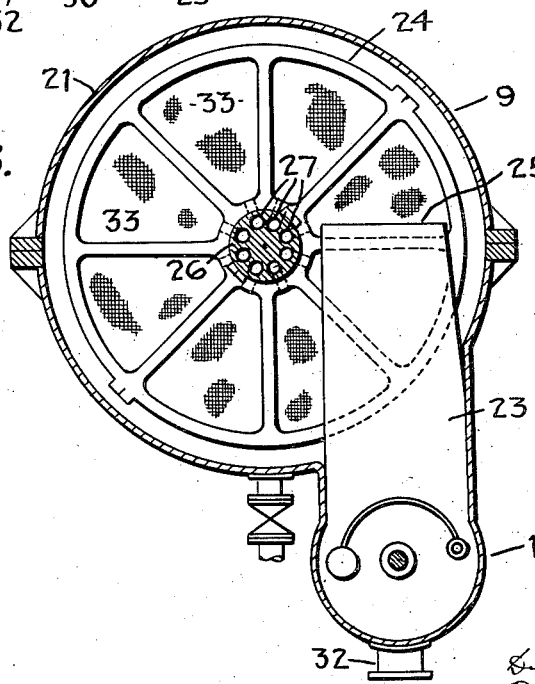

2,058,944

UNITED STATES PATENT OFFICE 2,058,944

PROCESS OF DEWAXING MINERAL OIL

Dwight P. Bailey, Bayonne, Robert Beattie, Plainfield, and Walter S. Tyler, Jr., Elizabeth, N. J., assignors, by mesne assignments, of three-fourths to Tide Water Oil Company, New York, N. Y., a corporation of Delaware Application August 31, 1932, Serial No. 631,142

6 Claims. (Cl. 196—19)

This invention relates to improvements in the removal of wax from petroleum oils and the like by filtration, using a filter aid.

For this purpose, the wax containing oil is first diluted with a suitable solvent, such as a naphtha, or any other solvent in which oil is soluble and wax is substantially or wholly insoluble at low temperatures. The solution of oil and solvent is then chilled at a rate which is determined by the type of wax to be crystallized from the solution and the size of the wax crystals necessary for a successful separation. For example, solutions containing wax which tend to form very small crystals and separate out rapidly on cooling are chilled relatively slowly in order that the crystals may have sufficient time to grow. On the other hand, waxes of a definite crystalline nature, such as some low boiling waxes which form large crystals as they separate, do not require slow chilling and a consequent long time for crystal growth. After the solution has been chilled in continuous process to a temperature slightly below that necessary for the filtration, a filter aid which is preferably a diatomaceous earth or an equivalent material is introduced into the solution, and the whole is agitated to form a homogeneous slurry which is then allowed to flow or is pumped to the filtration step. In this step, the diatomaceous earth and the wax crystals are separated from the oil solvent solution and a filter cake of this composition is formed, containing minute channels or pores through which the solution is drained through the cake by the pressure differential caused to exist between the outside and the inner surface of the cake itself. After the cake has been formed, it is withdrawn from the slurry or the slurry is withdrawn from the cake, and the solution remaining in the cake is removed by maintaining a gas pressure differential across the cake. After this step, the filter cake which contains comparatively little oil is removed from the filter cloth or equivalent medium and is mixed with warm solvent, such as naphtha, or any other solvent in which wax and oil are soluble at normal or slightly elevated temperatures, so that the wax contained is dissolved and may be removed from the filter aid in a subsequent filtration step. After washing with a suitable solvent, the filter aid is then available for re-cycling to the chilled solution.

The main object of this invention is to provide a method of dewaxing mineral oils with the use of a filter aid by continuous super-atmospheric pressure filtration.

An important object of this invention is to increase the filtering rate per unit area of filtration surface substantially over the rates obtained in present day commercial operation.

A further object of this invention is to provide a method whereby the amount of oil lost with the wax is considerably reduced in a filtration operation where high filtering rates are obtained.

An additional object of this invention is to provide a method whereby the clarity of filtrate may be maintained in the filtration step where high filtering rates are obtained.

Another object of this invention is to provide a method primarily adapted to the dewaxing of oils with a filter aid wherein a brittle dry filter cake of the wax and filter aid is obtained, which can be efficiently and completely discharged from the filtering medium, making it unnecessary to form thick cakes for efficient discharge.

A special object of this invention is to provide a method for dewaxing oils in which it is possible to use non-plugging metallic filtering cloths, and a method of cake discharge such that filter cloths will not be worn excessively either by scraping for the purpose of discharging the cake or by inflation for the purpose of loosening the cake.

At the present time, dewaxing by filtration with a filter aid has been practiced commercially, using two definite types of filtration: discontinuous pressure and continuous vacuum. These two methods have their various advantages and disadvantages, but in neither case is a thoroughly satisfactory operation obtained.

In dewaxing by discontinuous pressure filtration, the operation demands a long cycle time because of the necessity for draining the filter body and discharging the cake, which operations consume considerable time. The cycle of operation is somewhat as follows: The filter usually consists of a pressure resisting shell, in which are suspended plates covered with the filtering medium or cloth and fitted with drainage nipples leading through the shell so that the pressure maintained in the shell will serve as the pressure differential across the filter cake formed. The slurry of oil solvent solution, crystallized wax and filter aid is first introduced into the shell and circulated back to the slurry tank in order to insure constant low temperature during the filtering cycle and to facilitate the control of the pressure to be maintained in the shell. The filtration is then allowed to proceed and the pressure is gradually increased at such a rate that the cake is not unduly compressed as it is formed and small particles of wax are not scoured through the interstices of the cake. When the volume of the filtrate per unit of time has fallen below an economic rate, the filter shell is drained of slurry and the cake is blown to remove oil solution from its pores, after which the cake is discharged. In order to reduce the amount of oil held in the cake before it is discharged, the cake may be washed with cold solvent introduced in the same manner as the slurry and maintained under the final filtering pressure. After the cake is washed sufficiently, the filter is drained, the cake is blown, then discharged, and the cycle is repeated. On account of the time required for charging, washing, draining, and dumping a filter, it is desirable to allow the filtering cycle to continue as long as there is an appreciable filtering. The non-filtering time is practically constant and will increase only slightly with an increased filtering cycle.

Owing to the rapid increase in the thickness of the cake and possibly also to the compression of the cake, the filtering rate, in a discontinuous pressure operation, falls off rapidly, after the first few seconds of filtering time, to a rate which is a fraction of the original rate but which does not continue to decrease so rapidly as the cake builds up. The operation requires very delicate manipulation of pressure, which must be built up gradually, so that small wax particles are not scoured through the cake and so that the initial layers of the cake are not immediately compressed. If the attempt is made to maintain a constant pressure in this class of dewaxing operation, the effect is not only to raise the cold test on the finished oil as the result of an excessive number of wax particles passing through with the filtrate, but also the compression of the initial cake causes the initial high filter rate to drop off rapidly, so that for a given cycle time the total volume of filtrate for a given area is low. Actual operation of such a process has shown that, during the early stages of the filtration, a constant volume operation is the most desirable. The advantages to be derived from the discontinuous pressure operation when the pressure is carefully controlled are shown in the clarity of filtrate obtained and the small amount of oil lost with the wax in the filter cake. Clarity is secured by careful regulation of the increase in pressure as the filtering cycle proceeds. The low oil loss in the wax cake probably results from the compression of the cake towards the end of the filtering cycle, which serves to squeeze out the bulk of the oil solution left in the channels of the cake, and by reducing the cross-section of these channels increases the efficiency of the drying step, since the gas passing through the cake will effectually displace the liquid and leave relatively little adhering to the walls of the channels.

In dewaxing mineral oils by continuous vacuum filtration, advantage is taken of a relatively short cycle time and the relatively high flow rates obtaining during the initial stages of the filtration.

In such an operation, the filtering medium or cloth is mounted on a rotating disc or drum, and partial vacuum is applied to the internal surface of the cloth during certain portions of the cycle. The drum or disc is divided into individual sections or sectors, which can be placed under vacuum independently of each other. As the rotation proceeds, the sectors dip into the slurry contained in a pan, and after the submergence of an individual sector is complete vacuum is applied, so that filtrate is drawn through the cloth for discharge and a cake is formed on the cloth. On further rotation, the sector leaves the slurry, withdrawing the cake at the same time. The vacuum is maintained on the interior of the cloth and serves to drain the oil solution contained in the cake from the cake, by drawing air or gas through the channels of the cake, in what is known as the drying portion of the cycle. After the cake has been drained, cold solvent wash may be sprayed over the cake in order to recover additional oil from the wax cake. The vacuum is then shut off and a slight gas pressure is placed on the inside surface of the cloth, serving to distend the cloth slightly and loosen the cake, to assist its removal by the deflector blades or scrapers. The rotation continues and the sectors again dip into the slurry and vacuum is again applied as the operation is repeated.

In this way, a discontinuous process is made for all intents and purposes continuous, and overall filtering rates appreciably higher than those obtained in discontinuous pressure filter operations result. However, since the pressure differential across the wax cake obtained is limited by the maximum value of vacuum which it is practical to obtain, the amount of compression to which the filter cake can be subjected is limited. As a result of this limitation, considerable quantities of oil remain in the channels of the cake, and since this oil may not be removed to a large extent by subjecting the cake to pressure, it is necessary to drain the cake for a considerable length of time, and to pass a considerable amount of gas through it to clear the channels.

Because of the large price differential existing between oil and the crude wax which is obtained, the oil lost in the wax cake is an important factor in commercial work. In dewaxing oil with filter aid by the continuous vacuum method, the drying time of the cycle, that is to say the time during which gas is drawn through the cake of filter aid and wax to remove oil-solvent solution from the channels of the cake, must be long enough to reduce the oil loss to an economical limit, and consequently the actual filtering time must be considerably longer than a filtering period short enough to assure satisfactorily high filtering rates. A further disadvantage of this kind of operation is that, because of the insufficiently drained type of cake that is formed, it is exceedingly difficult to obtain an efficient removal of the filter cake from the filtering cloth. The only method of removal which approaches a satisfactory operation is to scrape the cake from the cloth. However, it is mechanically impossible to obtain a clean discharge in this manner, since part of the cake is smeared into the cloth whereas other parts of the cake can not be completely removed. As a result, the effective filtering area is considerably reduced while the interstices in that portion of the filtering cloth which has been scraped are partially plugged owing to the smearing action of the cake discharge scrapers, with the result that the full effect of the pressure differential will not be utilized for the filtering. The only way in which this difficulty could be met would be to build up sufficiently thick and heavy cakes so that they could be broken by the discharge blades and fall from the filter cloth by their own weight. If that were done, however, the total cycle time would have to be considerably increased so that, because of the rapidity with which the instantaneous filtering rate falls off, the over-all filter rate would be greatly reduced and be practically equal to or lower than that obtained by semi-continuous operation in pressure filters. It may also be stated that, since the initial filtering pressure can not be regulated in continuous vacuum filtering, and since the operation is practically a constant pressure one, a certain amount of the fine wax particles tend to pass through the cake, with the result that, other things being equal, it is necessary to filter at a somewhat lower temperature in dewaxing by continuous vacuum filtration than by discontinuous pressure filtration, in order to remove a given amount of wax and obtain an oil of a given cold-test.

We have found that it is possible to combine the advantages of dewaxing by discontinuous pressure filtration with the advantages of high rate and continuous operation in continuous vacuum filtration, when dewaxing oils by filtration with a filter aid. The invention set forth herein may be carried out with a filter operating in a manner similar to the operation of the continuous vacuum filter, with the difference that instead of maintaining the pressure differential across the filter cake by vacuum applied on the inside of the cake, the differential is obtained by maintaining a high or substantial gas pressure on and above the body of the liquid in which the filtering medium is submerged and from which it is raised. It has been found that the limitations of pressure filtration dewaxing can be overcome. In the light of experience in operating discontinuous pressure filters, it would be expected that in a continuous pressure operation, large amounts of wax would scour through the cake, with the result that in order to obtain a satisfactory removal of the wax from the oil, exceptionally low temperatures would be necessary. In filtering at pressures of 50 lbs. and 100 lbs. per square inch under the invention, it was found that the amount of wax carried through the cake was practically no greater than that carried through in a normal vacuum operation. This is indicated by the pour points obtained on finished oils when such oils resulted from filtration at a definite temperature wherein the pressure differential only was varied, and ranged from 25 in. Hg. vacuum to 100 lbs. per square inch. It was further found that the actual filtering rate obtained under pressure increased so rapidly with the pressure that it was possible greatly to decrease the actual filtering or pick-up time and thus take advantage of a very high initial filtering rate. At the same time the cake formed was sufficiently thick and suitably compressed so that complete and effectual discharge was possible. In contrast to the relatively soft cake obtained by continuous vacuum filtration, which require actual scraping to remove them from the filtering cloth, the cakes obtained in the instant process, when utilizing cycle times considerably shorter than those possible in vacuum filtrations, can be discharged from the filter cloth by simple breakage which involves only touching the cake with a scraper blade and necessitates no contact between the scraper blade and the filtering cloth. Further, it is not necessary to blow gas back through the cake and thus flex the filtering cloth, in order to loosen the cake and assist its discharge from the filter medium.

Since the problem of cake discharge has been greatly simplified by the type of cake formed, it has been found possible to improve the operation still further by using metallic filter cloth instead of cotton cloth as is usually necessary in vacuum operation. Since the cloth need not be flexed or scraped to obtain satisfactory cake removal, metallic cloth may be used without danger of breaks or leaks occurring as a result of continued flexing and scraping. Actual operation has shown the increased efficiency obtained in using a non-absorbent filtering medium such as a metallic cloth in the process claimed herein. The filter rates which result with the use of clean or new cotton cloth are practically identical with those obtained when using perfectly clean metallic cloth. However, as the filtration is repeated, without a blow-back in the cycle, the rates fall off asymptotically to rates which with metal cloth are approximately 85% to 90% of the original rate and only 10% to 25% of the original rate in the case of cotton cloth. This difference in the attainable rates with metallic and cotton cloth or the like is due to the wax and filter aid fines which become embedded in the dense cotton fabric during repeated filtration but which pass through the relatively open metallic cloth and leave the passages through the medium clear.

A further advantage which has been discovered lies in the fact that it is not necessary to chill the oil solution slowly in order to obtain a satisfactory operation. Ordinarily if the oil solution is rapidly or "shock" chilled, the size of the wax particles is so minute that a cake containing very small channels is formed. In ordinary pressure or vacuum operations, this entails a substantial decrease in the filtering rate. It has been shown that the effect of shock chilling is sufficient to reduce the filtering rate from 20% to 40%, depending on the type of wax contained in the oil, the more truly amorphous the wax the greater being the reduction in rate due to shock chilling. Thus, in ordinary commercial practice, it is imperative to cool such oil slowly in order to obtain a filtering rate high enough for economic operation. With this invention, utilizing continuous pressure filtration, the rates obtained are so satisfactory that it is possible to dewax shock-chilled oil solutions and still obtain rates several times as high as those obtainable with ordinary operations in which slow chilling of the oil has been observed. This in itself is an important saving.

In order to show more clearly the advantages to be derived from using this method in the dewaxing of oils in filter aid filtration, results using the former types of operation will be cited in comparison with those obtained by this method. In dewaxing a lubricating oil on a continuous disc type vacuum filter, it was necessary to use a 60% naphtha dilution and to filter at −35° F. with approximately .7 lbs. of filter aid per gallon of solution. Under these conditions a finished oil having a pour point of 0° F. was obtained. By operating on a 5 minutes cycle, of which the actual filtering time was 37%, a filtering rate of .8 gallon of dewaxed oil per square foot of filtering area per hour was attained, and the loss of oil in the wax was 11%. It is possible, but uneconomic on account of the low value of the wax, to increase the filter rate in such a case to 1.2 by decreasing the cycle time to 3 minutes, in which event the loss of oil in the wax will increase to 13% to 14%. In filtering the same oil in a discontinuous Kelly type pressure filter, the filtering temperature may be raised to −30° F. to obtain 0° F. cold test on the finished oil, the dilution and the filter aid concentration remaining the same as above. When using a 35 minute filtering time and 150 lbs. per square inch final pressure, a filter rate of .5 gallon of dewaxed oil per square foot per hour of cycle time was obtained and the loss of oil in the wax was held to 9.5%.

In contrast to these rates, operation under the present invention, when filtering the same slurry at −36° F. gives rates of 8.5 gallons of dewaxed oil per square foot per hour of cycle time at 50 lbs. per square inch pressure and 12.0 gallons at 100 lbs. per square inch. At the same time losses of oil in the wax are held within economic limits, being 11.3% at 50 lbs. and 10.9% at 100 lbs. The pour points obtained on the finished oils are 0° F. In this particular instance, the cycle times, using a continuous disc type pressure filter, were approximately 15 seconds, the filtration or "pickup" time itself being 5½ seconds of the cycle, and the drying period of the cycle being 4½ seconds. In spite of the abnormally short filtering time and drying time, sufficient filter cake was formed and subsequently effectively dried, as shown by the low wax loss, to make complete and satisfactory discharge of the cake from the filtering medium possible without blowing gas back through the cloth. In contrast to this, when the continuous vacuum filtration method was employed, it was necessary to blow large quantities of gas back through the cake and to remove it by actually scraping the filtering medium.

The accompanying drawings are illustrative of the process and of a suitable form of apparatus for carrying it into effect.

Fig. 1 is a diagrammatic representation of enough of the system of apparatus for preparing and chilling the oil-solvent solution, incorporating the filter aid, filtering the oil solution from the wax and filter aid, repulping the wax and filter cake material, filtering the wax solution from the filter aid and returning the latter to the dewaxing process.

Fig. 2 is a side elevation, partly broken away and in section, of a suitable form of dewaxing filter with which to carry out the process, the view being somewhat schematic since these matters will be readily understood.

Fig. 3 is a cross-section of the piece of apparatus shown in Fig. 2.

In a preferred form of the operation, the oil to be dewaxed and naphtha, or any other suitable solvent, are blended together in blending tank 1 to form a uniform solution which is then pumped by pump 2 through heat-exchanger 3, in which it is cooled by the cold dewaxed oil-solvent solution filtrate from separator 4. The partially chilled solution leaves exchanger 3 and enters chillers 5, where the remainder of the cooling takes place. The chilling medium may be either cold brine, or for very low temperatures anhydrous ammonia. The chilled oil solution leaves the chillers and passes to cold mixing tank 6, into which the filter aid recovered from hot filter 7 falls from the discharge blade of the filter. Suitable agitation causes the dispersion of the filter aid through the cold oil to form a homogeneous slurry. It is desirable to have a fairly violent agitation in this tank, since unless very uniform dispersion takes place the full effectiveness of the filter aid can not be realized in the subsequent filtering operation. The slurry leaves cold mixing tank 6 and enters pump 8, where it is raised to a pressure on the order of 100 lbs. to 150 lbs., and passes to the continuous pressure filter 9. This filter is preferably of the rotating disk type, and the oil level should be a little below the center line of the filter. It is desirable to have a float control the amount of oil pumped by pump 8, so that this level is kept practically constant. High pressure gas is introduced through line 10, above the oil level, in order to maintain the pressure during the filtration and to accomplish an effective recovery of the oil held in the cake composed of the wax and filter aid.

The gas is preferably flue gas, this being the cheapest inert gas. Air might be used if the solvent for the oil were substantially non-inflammable.

As the disks rotate, filtering takes place and dewaxed oil solution leaves as filtrate through line 11, together with the gas that is forced through the wax and filter aid cake during the drying period to free the cake of oil solution. This filtrate enters separating tank 4, from which the inert gas used to maintain the pressure in the filter and to dry the cake is released. The dewaxed oil solution then passes through line 12 to heat exchanger 3, as has been described before. By a subsequent operation the dewaxed oil is separated from the solvent.

The cake formed on the disks of the pressure filter after drying is discharged and falls directly into cake pulper 13, into which warm solvent is continuously introduced. Suitable agitation in the pulper insures the formation of a uniform slurry, which can be continuously discharged through pressure reducing valve 14 controlled by float 15. This slurry passes to hot mixing tank 16, which is maintained under approximately atmospheric pressure. Additional warm solvent, which may be wash liquid from hot filter 7, is introduced into tank 16, and a slurry is made under agitation which is suitable for treatment in hot filter 7. The cake slurry, consisting of wax, filter aid and solvent, enters this filter through line 17. A desirable filter for this operation is of the rotary drum vacuum type. In this filtering operation, the wax which was obtained in the filter cake from pressure filter 9 is removed in solution from the filter aid, and passes out through line 18 to separator 19, from which gas is withdrawn at the top and wax solution at the bottom. In most operations it is desirable to wash the filter aid cake formed in this filter with warm solvent, in order to remove all the wax from the filter aid. If this is done, the warm wash solvent may be withdrawn through an additional line to a separator, not shown, and introduced in the hot mixing tank for re-circulation. The filter aid cake discharged from the drum of the hot filter falls into cold mixing tank 6, for mixing and re-circulation with the chilled oil solution. Although not shown in this diagrammatic drawing, it is to be understood that inert gas balance lines, gas compressors and vacuum pumps are to be provided as required.

Figs. 2 and 3 illustrate a satisfactory form of continuous pressure filter that may be employed for the dewaxing of the oil. Generally, the filter consists of a pressure-resisting shell 21 and repulper 13, which are interconnected by a series of vertical slots or chutes 23, through which the cake material discharged from disks 24 by scrapers 25 falls. Disks 24, which consist of a number of pie-shaped sectors 33 and are mounted on shaft 26, rotate counter-clockwise with respect to the filtrate discharge end. Within shaft 26 are a series of filtrate channels 27, which connect to the individual pie-shaped sectors that are in alinement. In operation, the slurry level is maintained just below the center line of shaft 26, and gas under pressure is held above the slurry. As the disks rotate, the individual sectors pass between chutes 23 into the troughs formed between two adjacent slots, these troughs constituting a portion of the free volume of the filter shell. As soon as the sector is completely submerged, valve 28, the nature of which will be understood, connects the corresponding channel 27 with the line 11 to the separator 4 of Fig. 1, thus reducing the pressure on the inside of the sector, causing filtration to commence. The pressure differential obtained is thus the difference between the gas pressure maintained over the liquid within shell 21 and the pressure maintained in the filtrate receiver, which latter may be atmospheric pressure, or a pressure above or below atmospheric. The filtration continues until just before the individual sector commences to emerge from the liquid level, at which time valve 28 diverts the dewaxed solution from the filtrate line to the line 35, which also leads to the separator or receiver 4, or to a separate receiver. In this step the pressure differential between the pressure maintained in the shell and the back pressure, if any, maintained on the line 35 may be less than the filtering pressure differential. On continued rotation, the sector remains in the gas space and the liquid material held in the filter cake is forced out by gas passing through the filter cake. When the cake has been suitably dried, valve 28 shuts off the filtrate channel 27, bringing about equilibrium between the pressure in channel 27 and the pressure within shell 21. While this condition obtains, the sector passes through scrapers 25, and the cake is discharged into pulper 13, where it is admixed with warm naphtha introduced through nozzles 29. Agitator 30, driven by shaft 31, causes the formation of a homogeneous slurry, which may be discharged through nozzle 32 by a suitable pressure reducing valve.

It will be understood that the invention is not dependent upon the particular apparatus.

Mention has been made of a lowered gas pressure differential across the cake of filter aid and wax as affecting the drying step. For that purpose, it will be understood, a second separator or receiver, additional to the separator 4 of Fig. 1, would be provided together with means for keeping the desired back-pressure therein, and the line 35 would lead to this separate receiver. Advantage may be taken in this way of the excellent draining qualities of the cake that is produced in the filtering step, to cut down the expense of compressing the inert gas.

It will be appreciated that the type of filter cake which is formed in this process of dewaxing oil and which consists of the wax and filter aid separated from the chilled oil-solvent solution, and the ease with which this cake is discharged from the filtering medium, are important. Realization of the advantages of the invention depends on obtaining a cake of the stated materials which is definitely brittle and can be fractured by contact with the discharge blades, so as to break loose and fall clear from the filtering medium. This characteristic of the cake is in distinct contrast to the soft cakes produced in dewaxing by continuous vacuum filtration, such cakes being insufficiently compressed to be relatively rigid and consequently subject to fracture when they come in contact with the discharge blade.

It will be readily understood that the main operating variables are pressure and the actual filtering time and that these are inter-related and can not be definitely set. For example, when filtering under high pressure, a high instantaneous filter rate occurs, with the result that the thickness of the cake is increased rapidly. At the same time, high pressures tend to compress the cake to a greater extent, so that even though a relatively thin cake is formed, it is dischargeable. A cake of similar thickness formed at lower pressures would not be dischargeable. Thus, when operating at 100 lbs. pressure, a cake approximately $\tfrac{1}{16}$ inch thick is so compressed as to be brittle and completely dischargeable, whereas under somewhat lower pressure a cake of the same thickness would not break when brought against the discharge blades, but would tend to shave off the filtering medium. As the result of this type of cake, it is possible to filter at, for example, 100 lbs. pressure with pick-up or actual filtering times of as low as 2½ seconds, although, naturally, satisfactory operations are obtained when utilizing longer filtering times.

For a given filter, operating at such a pressure, the actual filtering time will be determined by the mechanical limitations of the filter itself and the volume desired. In some cases, on account of the cost of compressing the gas which maintains the pressure in the filter and serves to dry the cake, it may be more economical to filter at lower pressures. In that event, because of the lesser instantaneous filtering rate, the filtering time must be longer in order to build a filter cake of dischargeable thickness, which is up to about ¼ inch. When operating at a lower pressure, the cake formed will not be susceptible to fracture when the thickness is as low as $\tfrac{1}{16}$ inch, since the compressing or packing action of the pressure is less. For example, at 50 lbs. pressure, pick-up times on the order of 5 seconds are satisfactory, and with certain types of wax even shorter times are possible. However, for other operations, times even as high as 30/50 seconds may be desirable. Apparently when filtering at pressure differentials of 15/20 lbs. per square inch, it is virtually impossible to obtain filter cakes which may be fractured by contact with the discharge blade, even though relatively long filtering times be used.

The difficulty of setting the optimum conditions of filtering time and operating pressure is increased because of the fact that the waxes to be removed, contained in oils, differ considerably as to size and type of the crystals, which vary with the source of the lubricating oil, the boiling range of the oil, the nature and amount of coloring matter in the lubricating fraction, the type of distillation employed, and the rate at which the lubricating oil solvent solution has been chilled. It may be said generally that if the wax is of a fairly rigid crystal structure, which forms relatively large pores in the filter cake, lower pressures, such as 40/50 lbs. per square inch, may be used, while for wax of more amorphous character, which forms relatively small pores in the cake, higher pressures, on the order of 100 or even 200 lbs., are desirable. The filtering time can not be definitely limited, but will range on the order of 2½ to 10 or 20 seconds for operations when pressures of 100/200 lbs. are used, and from 5 to 30 or even 50 seconds when pressures on the order of 40 to 50 lbs. are used.

The process makes it unnecessary to wash the wax-filter-aid cake with solvent or to aid the discharge of cake material from the filtering medium by forcing back air or other gas against the inner side of the medium. However, the use of either or both of these familiar expedients is not necessarily excluded. Either or both of them may be resorted to, at considerable intervals rather than at each cycle, to clean the filtering medium and remove, periodically, the fines which tend to reduce the filtering rate. When a textile cloth filtering medium, instead of a metallic medium, is employed, a blow-back per cycle may be deemed desirable.

What is claimed as new is:

1. A continuous process for the dewaxing of mineral oils by filtration, which comprises continuously supplying, under pressure, a chilled mixture of an oil-solvent solution and the wax precipitated or crystallized therefrom, together with a filter-aid material, to a chamber in which a filtering medium is moved so that it is alternately beneath and above a level of the mixture, maintaining on the surface of the mixture a high super-atmospheric gas pressure and so regulating filtering pressure and short filtering time as to form on the filtering medium, of the wax and filter-aid material, a compressed, brittle cake of moderate thickness, capable, after being drained, of being broken completely away from the filtering medium, utilizing the said gas pressure to force gas through said filter cake and thereby drain the cake to such dryness that it will part cleanly from the filtering medium, and discharging the drained cake from the filtering medium by simple fracture, the discharged filter cake being removed from the filtration operation, and the dewaxed oil-solvent solution being continuously withdrawn for subsequent recovery of dewaxed oil.

2. A continuous process for the dewaxing of mineral oils by filtration in the presence of filter-aid material, which comprises continuously supplying, under pressure, a chilled mixture of oil diluted with a solvent, the wax precipitated or crystallized therefrom, and the filter-aid material, to a chamber where a hollow filter medium is moved so that it is alternately beneath and above a level of the mixture, maintaining on the surface of the mixture a high super-atmospheric gas pressure and so regulating filtering pressure and short filtering time as to form on the filtering medium, of the wax and filter-aid material, a compressed, brittle cake of moderate thickness, capable, after being drained, of being broken completely away from the filtering medium, draining said cake to such dryness that the cake will part cleanly from the filtering medium, and discharging the drained cake from the filtering medium by forcibly contacting the cake with a fracturing device kept out of contact with the filtering medium, the discharged filter cake being removed from the filtration operation, and the dewaxed oil-solvent solution being continuously withdrawn for subsequent recovery of dewaxed oil.

3. A continuous process for the dewaxing of mineral oils by filtration in the presence of filter-aid material as set forth in claim 2, further characterized in that a non-absorbent fabric is employed as the filtering medium.

4. A continuous process for the dewaxing of mineral oils by filtration in the presence of filter-aid material as set forth in claim 2, further characterized in that metallic cloth is employed as the filtering medium.

5. A continuous process for the dewaxing of mineral oils by filtration, which comprises continuously supplying, under pressure, a chilled mixture of an oil-solvent solution and the wax precipitated or crystallized therefrom, together with a filter-aid material, to a chamber in which a filtering medium is moved so that it is alternately beneath and above a level of the mixture, maintaining on the surface of the mixture a high super-atmospheric gas pressure and so regulating filtering pressure and short filtering time as to form on the filtering medium, of the wax and filter-aid material, a compressed, brittle cake of moderate thickness, capable, after being drained, of being broken completely away from the filtering medium, utilizing the said gas pressure to force gas through said filter cake and thereby drain the cake to such dryness that it will part cleanly from the filtering medium, discharging the drained cake from the filtering medium by fracture, allowing the cake material to fall directly into a replenished body of solvent separately contained but under the same gas pressure, continuously withdrawing a fluent mixture of this solvent, the wax and the filter-aid material, and separately withdrawing the dewaxed oil solution.

6. A process of dewaxing hydrocarbon oils, which comprises continuously supplying, under pressure, a chilled oil-solvent solution, containing precipitated or crystallized wax and filter aid material, to a cyclical operation in which a filtering medium passes successively through steps of filtration, drying and cake discharge, applying a gas pressure sufficient to produce a filtering pressure differential of about 40 lbs. or upwards per square inch, so correlating the filtering time and the filtering pressure that a brittle filter cake of the wax and filter aid about $\frac{1}{16}$ to $\frac{1}{4}$ inch thick is formed, expelling oil and solvent from this cake by the passage through it of the high-pressure gas, discharging this cake from the filtering medium by fracture, leaving the filtering medium clean, and continuously withdrawing the dewaxed oil-solvent solution for subsequent separation.

DWIGHT P. BAILEY.
ROBERT BEATTIE.
WALTER S. TYLER, Jr.